(12) United States Patent
Smith

(10) Patent No.: US 9,734,639 B2
(45) Date of Patent: Aug. 15, 2017

(54) SYSTEM AND METHOD FOR MONITORING AN INDUSTRIAL VEHICLE

(71) Applicant: Hand Held Products, Inc., Fort Mill, SC (US)

(72) Inventor: Taylor Smith, Charlotte, NC (US)

(73) Assignee: Hand Held Products, Inc., Fort Mill, SC (US)

(*) Notice: Subject to any disclaimer, the term of this patent is extended or adjusted under 35 U.S.C. 154(b) by 50 days.

(21) Appl. No.: 14/969,748

(22) Filed: Dec. 15, 2015

(65) Prior Publication Data

US 2016/0189443 A1 Jun. 30, 2016

Related U.S. Application Data

(60) Provisional application No. 62/098,708, filed on Dec. 31, 2014.

(51) Int. Cl.
*G07C 5/02* (2006.01)
*G07C 5/08* (2006.01)
(Continued)

(52) U.S. Cl.
CPC ........... *G07C 5/02* (2013.01); *G06K 9/00255* (2013.01); *G06K 9/00288* (2013.01);
(Continued)

(58) Field of Classification Search
CPC ................................ G07C 5/02; G07C 5/0841
See application file for complete search history.

(56) References Cited

U.S. PATENT DOCUMENTS

| 4,949,263 A | 8/1990 | Jurca |
|---|---|---|
| 6,832,725 B2 | 12/2004 | Gardiner et al. |

(Continued)

FOREIGN PATENT DOCUMENTS

| GB | 2535611 A | 8/2016 |
|---|---|---|
| JP | 2010182209 A | 8/2010 |

(Continued)

OTHER PUBLICATIONS

European combined Search and Examination Report in related GB Application No. 1522371.2, Dated Jun. 21, 2016, 6 pages.

(Continued)

*Primary Examiner* — Basil T Jos
(74) *Attorney, Agent, or Firm* — Additon, Higgins & Pendleton, P.A.

(57) ABSTRACT

A system and method for monitoring an industrial vehicle are presented. The system includes a first imaging subsystem for acquiring a plurality of load-carrying-portion images. A cargo-detection subsystem is configured for analyzing each of the plurality of load-carrying-portion images to determine whether cargo is positioned on the load-carrying portion. A power-detection subsystem is configured for determining when the industrial vehicle is running. A motion-detection subsystem is configured for determining when the industrial vehicle is in motion. An analytics subsystem is configured for calculating the amount of time that the industrial vehicle is running, the amount of time that the industrial vehicle is running while cargo is positioned on the load-carrying portion, the amount of time the industrial vehicle is in motion, and the amount of time the industrial vehicle is in motion while cargo is positioned on the load-carrying portion.

20 Claims, 6 Drawing Sheets

(51) Int. Cl.
*G06K 9/62* (2006.01)
*G06K 9/00* (2006.01)

(52) U.S. Cl.
CPC ....... *G06K 9/00838* (2013.01); *G06K 9/6201* (2013.01); *G07C 5/0841* (2013.01); *G07C 5/0866* (2013.01); *G07C 5/0825* (2013.01)

(56) References Cited

U.S. PATENT DOCUMENTS

| | | |
|---|---|---|
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |

(56) References Cited

U.S. PATENT DOCUMENTS

| | | |
|---|---|---|
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2006/0287841 A1 | 12/2006 | Hoshi et al. |
| 2007/0063048 A1 | 3/2007 | Havens et al. |
| 2009/0134221 A1 | 5/2009 | Zhu et al. |
| 2009/0143923 A1 | 6/2009 | Breed |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0239224 A1 | 9/2012 | McCabe et al. |
| 2012/0273306 A1 | 11/2012 | Pangrazio et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |

(56) References Cited

U.S. PATENT DOCUMENTS

| | | |
|---|---|---|
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0050356 A1* | 2/2016 | Nalepka .......... H04N 5/23203 348/148 |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0189443 A1 | 6/2016 | Smith et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz, Sr. et al. |
| 2016/0314294 A1 | 10/2016 | Kubler et al. |

(56) References Cited

U.S. PATENT DOCUMENTS

FOREIGN PATENT DOCUMENTS

| WO | 2013163789 A1 | 11/2013 |
|---|---|---|
| WO | 2013173985 A1 | 11/2013 |
| WO | 2014019130 A1 | 2/2014 |
| WO | 2014110495 A1 | 7/2014 |
| WO | 2016028816 A1 | 2/2016 |

OTHER PUBLICATIONS

U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 14 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning tiled May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Auguemented Reality Enabled Hazard Display filed May 19, 2015 (Venkatesha et al.); 35 pages.
U.S. Appl. No. 14/735,717 for Indicia-Reading Systems Having an Interface With a User's Nervous System tiled Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 141747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 291529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch Fora Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.

\* cited by examiner

SYSTEM AND METHOD FOR MONITORING AN INDUSTRIAL VEHICLE

CROSS-REFERENCE TO RELATED APPLICATION

The present application claims the benefit of U.S. Patent Application No. 62/098,708 for a System and Method for Monitoring an Industrial Vehicle filed on Dec. 31, 2014. The foregoing patent application is hereby incorporated by reference in its entirety.

FIELD OF THE INVENTION

The disclosure relates generally to industrial vehicles, and more particularly, to a system and method for monitoring an industrial vehicle.

BACKGROUND OF THE DISCLOSURE

Industrial vehicles are commonly used to transport materials and equipment in a facility. Industrial vehicles are particularly useful for transporting loads that are too heavy to be transported by human-powered means. Because a fleet of industrial vehicle can represent a significant industrial investment for a business, tracking the use of these industrial vehicles is important to maximizing their utility and their life-expectancy.

Warehouse operators, fleet supervisors, and other interested parties commonly track the following metrics in regard to their industrial vehicles: hours of operation, hours of operation while carrying a load, hours in motion, hours in motion while carrying a load, and hours of operation with a driver inside the vehicle. Tracking these metrics can provide an understanding of how each industrial vehicle is being utilized. This can be important in anticipating maintenance needs as well as the need to purchase additional industrial vehicles. This information may also be useful in providing training to employees to better maximize their use of an industrial vehicle.

One conventional approach to gathering these types of metrics would be to install sensors on the industrial vehicle. For example, a scale sensor could be installed to determine whether there is cargo present in the load-carrying portion of the industrial vehicle. Another sensor could be installed to detect when a driver is present in the driver compartment. Installation of these types of sensors would require a costly retrofit to an existing fleet.

What is needed is a system for monitoring an industrial vehicle that can be easily installed into an existing industrial vehicle, or that can be easily integrated into the manufacturing of a new industrial vehicle.

SUMMARY

In one aspect, the present disclosure embraces a system for monitoring an industrial vehicle having a load-carrying portion and a driver compartment. The system includes a first imaging subsystem for acquiring a plurality of load-carrying-portion images. The system also includes a cargo-detection subsystem. The cargo-detection subsystem is in communication with the first imaging subsystem. The cargo-detection subsystem is configured for analyzing each the plurality of load-carrying-portion images to determine whether cargo is positioned on the load-carrying portion. The system also includes a power-detection subsystem for determining when the industrial vehicle is running. The system also includes a motion-detection subsystem for determining when the industrial vehicle is in motion. The system also includes an analytics subsystem. The analytics subsystem is in communication with the cargo-detection subsystem, the power-detection subsystem, and the motion-detection subsystem. The analytics subsystem is configured for calculating (i) the amount of time that the industrial vehicle is running; (ii) the amount of time that the industrial vehicle is running while cargo is positioned on the load-carrying portion; (iii) the amount of time the industrial vehicle is in motion; and (iv) the amount of time the industrial vehicle is in motion while cargo is positioned on the load-carrying portion.

In an alternative embodiment, the cargo-detection subsystem determines whether cargo is positioned on the load-carrying portion by comparing each of the plurality of load-carrying-portion images to a configuration image of the load-carrying portion.

In another alternative embodiment, the configuration image of the load-carrying portion is an image of the load-carrying portion with no cargo.

In yet another alternative embodiment, the system includes a second imaging subsystem for acquiring a plurality of driver compartment images. The system also includes a driver-detection subsystem for analyzing the plurality of driver compartment images to determine whether a driver is present in the driver compartment. According to this alternative embodiment of the system according to the present disclosure, the analytics subsystem is in communication with the driver-detection subsystem and is further configured for calculating the total time that the vehicle is running while a driver is present in the driver compartment.

In yet another alternative embodiment, the driver-detection subsystem determines whether a driver is present in the driver compartment by comparing each of the plurality of driver compartment images to a configuration image of the driver compartment.

In yet another alternative embodiment, the configuration image of the driver compartment is an image of the driver compartment with no driver present.

In yet another alternative embodiment, the driver-detection subsystem includes a facial recognition module. According to this alternative embodiment of the system according to the present disclosure, the driver-detection subsystem determines that a driver is present in the driver compartment if the facial recognition module detects a human face in an image of the driver compartment.

In another aspect, the present disclosure embraces a self-monitoring industrial vehicle having a load-carrying portion and a driver compartment. The industrial vehicle includes a first imaging subsystem for acquiring a plurality of load-carrying-portion images. The industrial vehicle also includes a cargo-detection subsystem in communication with the first imaging subsystem. The cargo-detection subsystem is configured for analyzing the plurality of load-carrying-portion images to determine whether cargo is positioned on the load-carrying portion. The industrial vehicle also includes a power-detection subsystem for determining when the industrial vehicle is running. The industrial vehicle also includes a motion-detection subsystem for determining when the industrial vehicle is in motion. The industrial vehicle also includes an analytics subsystem in communication with the cargo-detection subsystem, the power-detection subsystem, and the motion-detection subsystem. The analytics subsystem is configured for calculating (i) the amount of time that the industrial vehicle is running; (ii) the amount of time that the industrial vehicle is running while cargo is positioned on the load-carrying portion; (iii) the amount of time the industrial vehicle is in motion; and (iv) the amount of time the industrial vehicle is in motion while cargo is positioned on the load-carrying portion.

In another aspect, the present disclosure embraces a computerized method of monitoring an industrial vehicle having a load-carrying portion and a driver compartment. According to the computerized method, a plurality of load-carrying-portion images of the industrial vehicle are acquired. The plurality of load-carrying-portion images of the industrial vehicle are analyzed using a computer to determine whether cargo is positioned on the load-carrying portion. It is determined when the industrial vehicle is running and when the industrial vehicle is in motion. The following are calculated using the computer: (i) the amount of time that the industrial vehicle is running; (ii) the amount of time that the industrial vehicle is running while cargo is positioned on the load-carrying portion; (iii) the amount of time the industrial vehicle is in motion; and (iv) the amount of time the industrial vehicle is in motion while cargo is positioned on the load-carrying portion.

DETAILED DESCRIPTION

Figure 1:
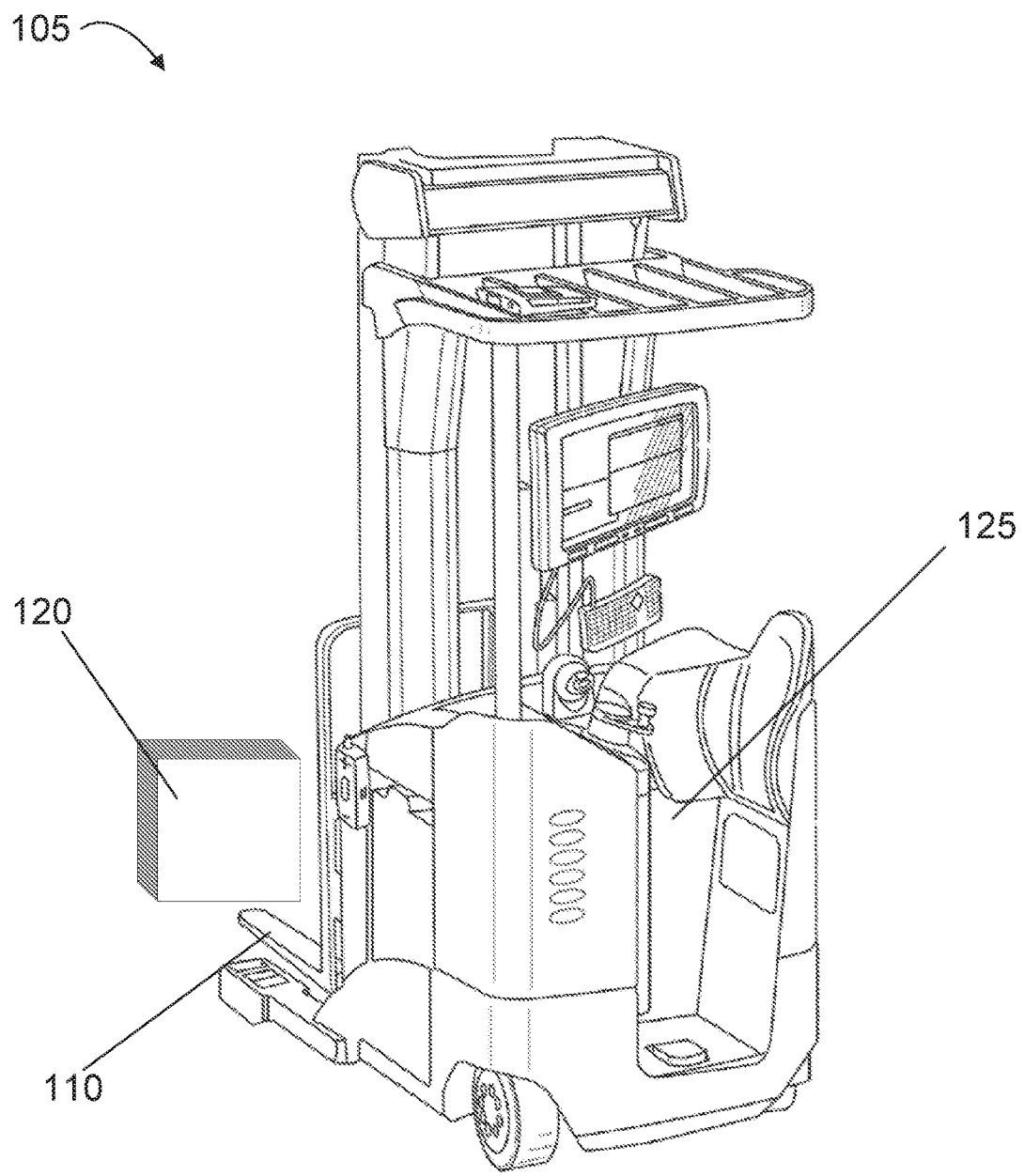
FIG. 1 is a perspective view of an exemplary industrial vehicle.

The system according to the present invention is directed toward monitoring an industrial vehicle having a load-carrying portion and a driver compartment. Industrial vehicles include, for example, forklifts, pallet trucks, material handling vehicles, tow tractors, lift trucks, container handlers, orderpickers, sideloaders, stacker/retrieval machines, reach trucks, swing reach trucks, counterbalanced forklift vehicles, and similar vehicles driven (e.g., maneuvered, operated, etc.) by a human operator. Typically, these industrial vehicles are operated in a facility that includes a warehouse. Other types of facilities include ports, rail yards, trucking terminals, distribution centers, etc.

Rather than monitoring the industrial vehicle exclusively through the installation of, or interconnection with, sensors, the present system monitors the use of the industrial vehicle, at least in part, through the analysis of images of the industrial vehicle. For example, to determine whether the industrial vehicle is carrying a load (e.g., carrying cargo), the system acquires load-carrying-portion images (e.g., the forks of a forklift) of the industrial vehicle. In other words, the system acquires an image (e.g., a digital photograph, digital image, etc.) depicting that portion of the industrial vehicle which typically carries a load (e.g., cargo). The system applies image processing techniques to determine, based upon the acquired images, whether cargo is positioned on the load-carrying portion. The system may be configured by using a configuration image, such as an image of the load-carrying portion with no cargo present. If an acquired image substantially matches the configuration image, the system determines that there is no cargo present. If, however, an acquired image substantially differs from the configuration image (e.g., some or all of the load-carrying portion is obscured (e.g., obscured by an object)), the system determines that cargo is present.

The system applies a similar approach to determine whether an operator is present in the driver portion. The system acquires driver compartment images. Applying image processing techniques, the system determines whether a driver is present in the driver compartment. The system may incorporate as part of the applied image processing techniques a facial recognition algorithm for recognizing the presence of a human face in an image. The facial recognition technique may even be used to determine the specific identify of the operator, which may be used to log operator time, for example.

The system according to the present disclosure advantageously can leverage existing components of an industrial vehicle. Some industrial vehicles are equipped with at least one camera. This camera may be used to record and preserve video of the industrial vehicle's movements in the moments before (e.g., the 30 seconds preceding) an accident. There may be more than one camera (e.g., for recording the area in front of and behind the industrial vehicle). These cameras are typically in communication with a vehicle mount computer (or other onboard computer device), which controls the recording and preserving of video (e.g., by storing the video on a hard disk). The system according to the present disclosure can readily be integrated with this type of equipment, potentially through the installation of appropriate software on the vehicle mount computer. In this way, the system according to the present disclosure provides a cost-efficient solution for monitoring the operation of an industrial vehicle.

Referring to the figures in the accompanying drawings, certain illustrative embodiments of the system according to the present disclosure will be described in great detail, where like elements will be indicated using like reference numerals. Turning now to the drawings, FIG. 1 is an exemplary embodiment of an industrial vehicle 105 suitable for monitoring by the system according to the present disclosure. In this instance, the industrial vehicle is a forklift. As mentioned above, however, a suitable industrial vehicle may be any of a variety of industrial vehicles.

The industrial vehicle 105 has a load-carrying portion 110 (e.g., a cargo portion, a storage section, etc.). In this instance, the load-carrying portion 110 includes the forks of the forklift. The load-carrying portion 110 may also include the heel and the mast assembly. In instances where the industrial vehicle is not a forklift, the load-carrying portion may include a truck bed (e.g., cargo bed), a towing assembly, a platform, or any other portion of the industrial vehicle configured for carrying cargo 120. The cargo 120 may be any type of load being carried (e.g., transported) by the industrial vehicle, including pallets and objects positioned on a pallet, containers, packages, goods, equipment, and the like.

The industrial vehicle 105 also has a driver compartment 125. The operator (e.g., driver) of the industrial vehicle is positioned at the driver compartment when the operator is driving (e.g., operating) the industrial vehicle. The exemplary industrial vehicle 105 depicted in FIG. 1 features a driver compartment 125 at the rear portion of the industrial vehicle 105 where the operator stands while driving the industrial vehicle 105. The driver compartment 125 may be in a variety of configurations. One common configuration of the driver compartment includes a seat upon which the driver sits during operation of the industrial vehicle 105. In other configurations, the operator of the industrial vehicle 105 may not be positioned on or inside the industrial vehicle 125 while operating the industrial vehicle 125. For example, some industrial vehicles 105 may be operated by a driver who is walking in front of, behind, or beside the industrial vehicle 105. In these configurations, the driver compartment typically includes the portion of the industrial vehicle 105 having the controls to the industrial vehicle 105 (e.g., steering controls). In instances where the industrial vehicle is controlled remotely, the driver compartment is the location where the driver is positioned while operating the vehicle.

Figure 2:
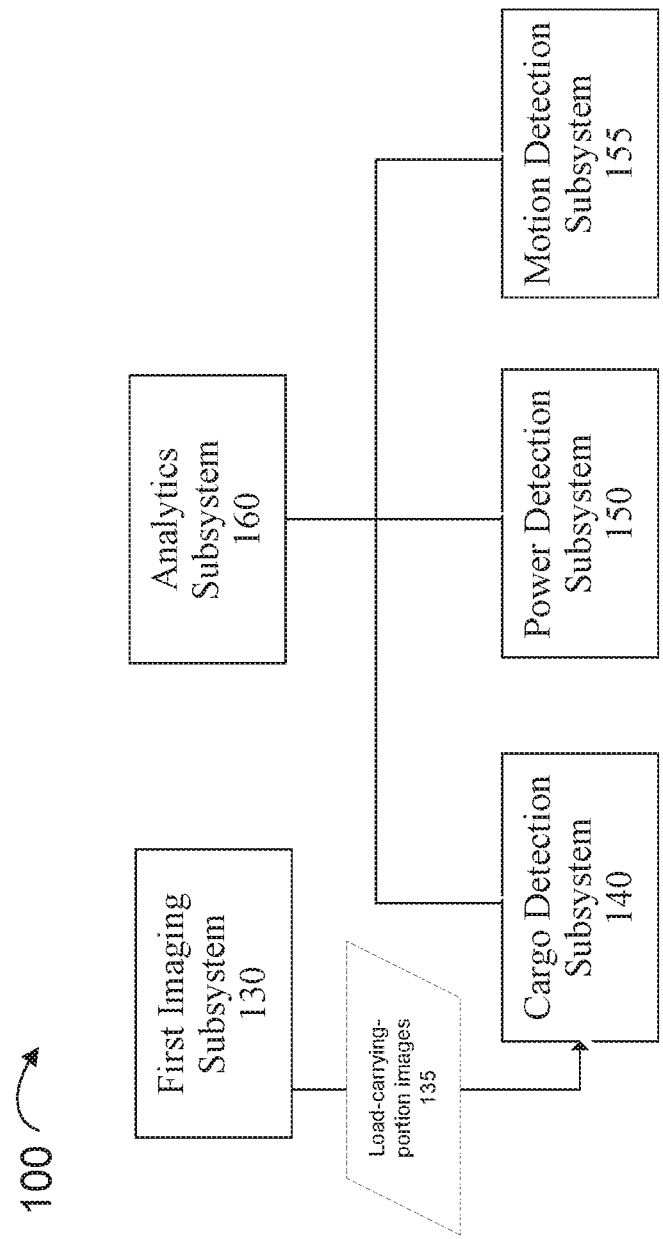
FIG. 2 is block diagram of an exemplary embodiment of a system according to the present disclosure.

As shown in FIG. 2, the system 100 for monitoring an industrial vehicle 105 according to the present disclosure includes a first imaging subsystem 130. The first imaging subsystem 130 is configured for acquiring a plurality of load-carrying-portion images. Typically, the first imaging subsystem 130 includes a video camera (e.g., CCD, CMOS, etc.) and the plurality of images is a video (e.g., digital video, digital video file, etc.). Video is usually captured as digital video. Less commonly, the video may be analog video. Alternatively, the first imaging system 130 may include a still camera (e.g., digital SLR camera) for acquiring images in the form of still images. Typically, the first imaging subsystem 130 includes means for storing the acquired images, such as a memory (e.g., digital memory, hard drive, solid-state hard drive, etc.).

As mentioned, the first imaging subsystem 130 is configured for acquiring a plurality of images of the load carrying-portion 135 of the industrial vehicle. Typically, configuring the first imaging subsystem 130 entails positioning a camera such that the camera's field of view encompasses at least the load-carrying portion 110.

The system 100 also includes a cargo-detection subsystem 140. The cargo-detection subsystem 140 is in communication (e.g., electronic communication, electronically connected, etc.) with the first imaging subsystem 130 such that information, including load-carrying-portion images 135 can be transmitted from the first imaging subsystem 130 to the cargo-detection subsystem 140.

The cargo-detection subsystem 140 is configured for analyzing each of the plurality of load-carrying-portion images 135 (e.g., analyzing substantially all of the frames of video) to determine whether cargo 120 is positioned on the load-carrying portion 110. Typically, the cargo-detection subsystem 140 includes computer software stored in non-transitory computer readable memory and executed by a processor (e.g., computer processor, CPU). The computer software usually includes image processing algorithms commonly used to analyze digital photographs and other digital images. The processor and non-transitory computer readable medium may be components of a vehicle mount computer mounted to, or installed in, the industrial vehicle 105. By analyzing (e.g., processing) the load-carrying-portion images 135 (e.g., using image processing software), the cargo-detection subsystem is able to determine in which images cargo 120 is present on the load-carrying portion 110 and in which images cargo 120 is not present.

In one embodiment, the cargo-detection subsystem 140 utilizes a configuration image of the load-carrying portion to determine whether cargo is present. Typically, the configuration image is an image of the load-carrying portion 110 as it appears when no cargo 120 is present (e.g., when the industrial vehicle is not under load). The cargo-detection subsystem 140 compares the load-carrying-portion images 135 received from the first imaging subsystem 130 to this configuration image. If, for example, the load-carrying portion 110 is obscured in a given image, then the cargo-detection subsystem 140 may assume that cargo 120 is obstructing the view and, therefore, determine that the industrial vehicle 105 is under load (e.g., that the industrial vehicle is carrying cargo).

The system 100 also includes a power-detection subsystem 150. The power detection subsystem 150 is configured to determine when the industrial vehicle is running (e.g., powered up, under power, turned on, etc.). The power-detection subsystem 150 may determine when the industrial vehicle is running using a variety of suitable techniques. For example, the power-detection subsystem 150 may receive a signal (e.g., electrical signal) from the industrial vehicle's ignition system, engine, and/or motor. Alternatively, the power-detection subsystem 150 may determine that when the system 100 is powered, then the industrial vehicle 105 is also running.

The system 100 also includes a motion-detection subsystem 155. The motion-detection subsystem 155 is configured for determining when the industrial vehicle 105 is in motion (e.g., when it is moving, being driven forward/backward, etc.). The motion-detection subsystem 155 may determine that the industrial vehicle 105 is in motion using a variety of techniques. For example, and without intending to limit the disclosure, the motion-detection subsystem 155 may include, or may be configured to receive a signal from, an accelerometer. Alternatively, the motion-detection subsystem 155 may analyze the load-carrying-portion images 135 to determine when the industrial vehicle 105 is in motion. This may be done by processing the images to determine when objects in the background (e.g., walls, floors, etc.) are moving in relation to the industrial vehicle 105.

The system 100 also includes an analytics subsystem 160. The analytics subsystem 160 is in communication with (e.g., electronically connected to) the cargo-detection subsystem 140, the power-detection subsystem 150, and the motion-detection subsystem 155. As such, the analytics subsystem 160 can receive information regarding whether the industrial vehicle is under load (e.g., carrying cargo), whether the industrial vehicle is under power, and whether the industrial vehicle is in motion. Typically, the analytics subsystem 160 is, or includes, computer software having algorithms for managing and manipulating the information received by the analytics subsystem 160, including by generating various metrics for measuring, for example, the performance and utility of the industrial vehicle. As will be appreciated by a person of ordinary skill in the art, the analytics subsystem 160 may also be, or include, computer hardware (e.g., integrated circuits) adapted to execute these algorithms.

In any event, the analytics subsystem 160 is configured for calculating the amount of time that the industrial vehicle is running. Typically, for each period of time that the power-detection subsystem 150 indicates that the industrial vehicle is running, the analytics subsystem 160 increases a corresponding counter (e.g., time counter) by the same period of time.

The analytics subsystem 160 is also configured for calculating the amount of time that the industrial vehicle is running while cargo 140 is positioned on the load-carrying portion 110. Typically, for each period of time that the power-detection subsystem 150 determines that the industrial vehicle is under power at the same time that the cargo-detection subsystem 140 determines that the industrial vehicle 105 is under load, the analytics subsystem 160 increases the corresponding counter by the same period of time.

The analytics subsystem 160 is also configured to calculate the amount of time the industrial vehicle 105 is in motion. Typically, for each period of time that the motion-detection subsystem 155 determines that the industrial vehicle 105 is in motion, the analytics subsystem 160 increases the corresponding counter by the same period of time.

The analytics subsystem 160 is also configured to calculate the amount of time that the industrial vehicle 105 is in motion while cargo 120 is positioned on the load-carrying portion 110. Typically, the analytics subsystem 160 increases the appropriate counter by an amount of time equal to the period of time when the motion-detection subsystem 155 determines that the industrial vehicle 105 is in motion at the same time that the cargo-detection subsystem 140 determines that there is cargo 120 positioned on the load-carrying portion 110.

Figure 3:
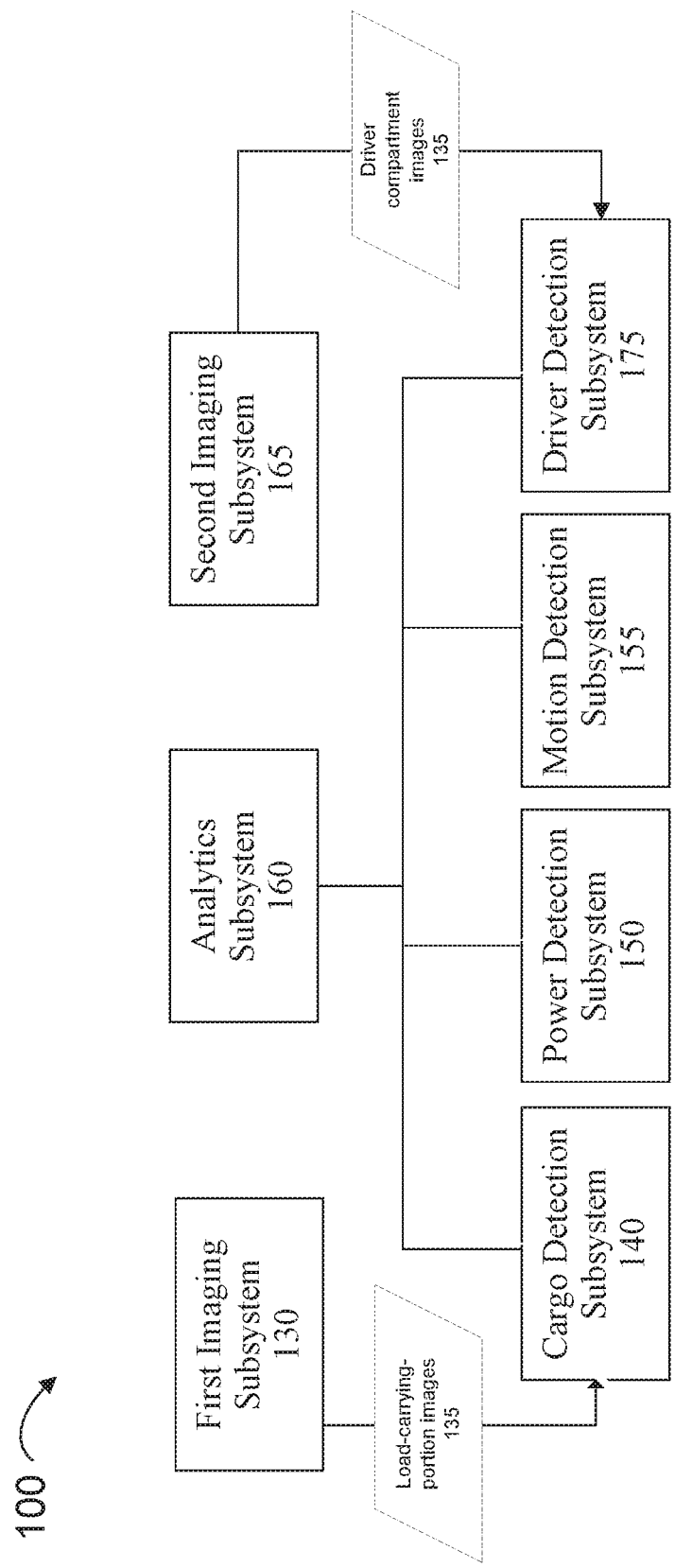
FIG. 3 is block diagram of an alternative embodiment of a system according to the present disclosure.

In an alternative embodiment illustrated in FIG. 3, the system 100 according to the present disclosure includes a second imaging subsystem 165. The second imaging subsystem 165 is configured for acquiring a plurality of driver compartment images 170. Driver compartment images 170 are images (e.g., digital video) of the industrial vehicle's driver compartment 125. Typically, the second imaging subsystem 165 includes a camera (e.g., video camera) positioned so that the driver compartment 125 is within the camera's field of view.

A driver-detection subsystem 175 is configured for analyzing the plurality of driver compartment images to determine whether a driver is present in the driver compartment. Typically, the driver-detection subsystem 175 includes computer software that, when executed by a computer processor, applies image processing techniques to analyze the driver compartment images 170 (e.g., to identify objects depicted in the images). The driver-detection subsystem 175 may utilize a configuration image of the driver compartment 125. For example, the driver-detection subsystem 175 may compare a configuration image known to depict a driver compartment with no driver to the received driver compartment images 170. When a given driver compartment image 170 substantially differs from the configuration image, the driver-detection subsystem 175 determines that a driver is present in the driver compartment 125.

According to this alternative embodiment, the analytics subsystem 160 is in communication with the driver-detection subsystem 175. The analytics subsystem 160 can, therefore, receive information from the driver-detection subsystem 175 regarding whether a driver is present in the driver compartment 125 of the industrial vehicle 105. The analytics subsystem 160 is configured for calculating the total time that the vehicle is running while a driver is present in the driver compartment. For example, the analytics subsystem 160 may increase the appropriate counter (e.g., time counter) for a period of time equal to the duration that the driver-detection subsystem 175 indicates a driver is present while the power-detection subsystem 150 indicates that the industrial vehicle 105 is running.

Figure 4:
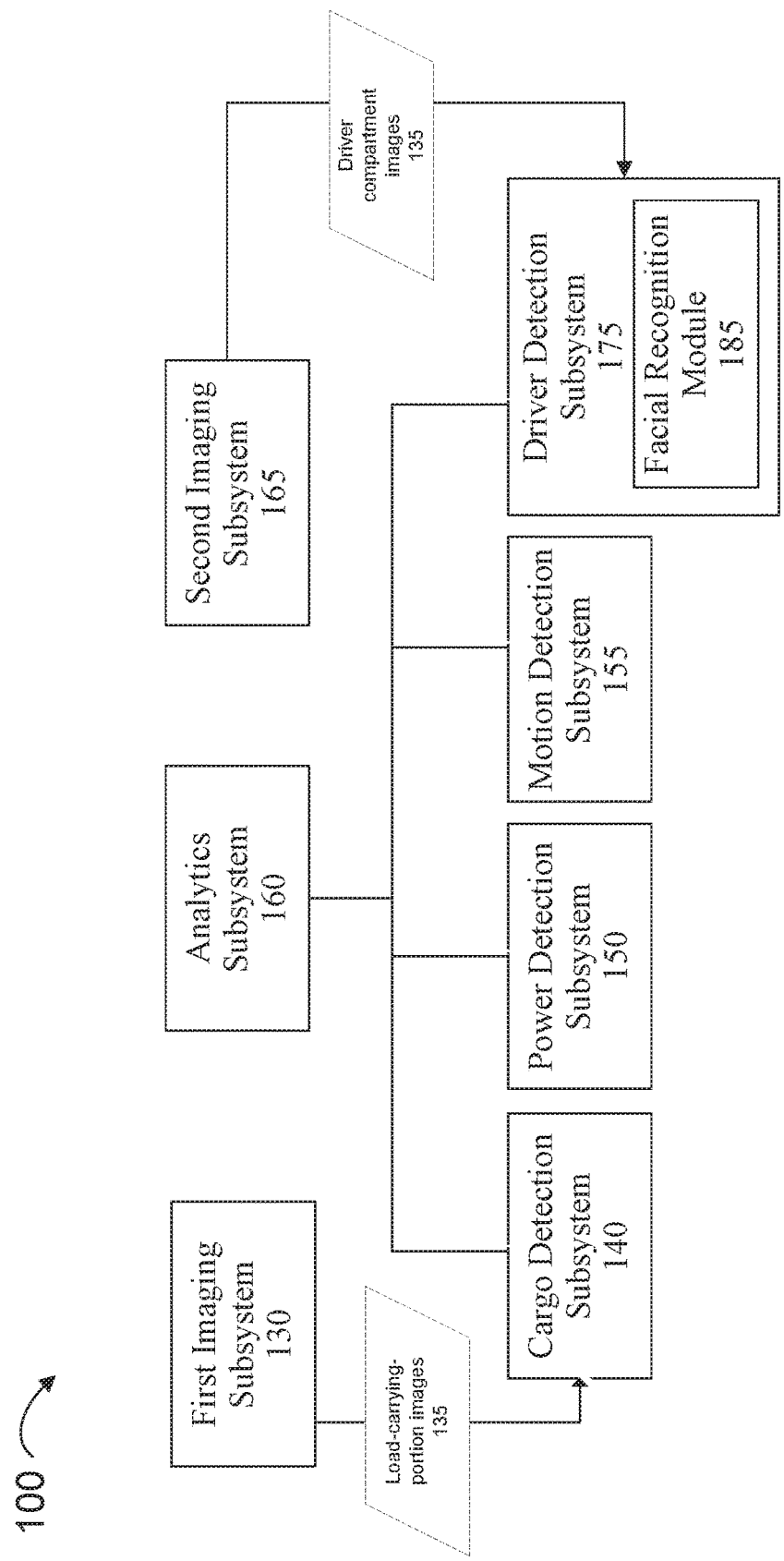
FIG. 4 is block diagram of an alternative embodiment of a system according to the present disclosure.

In an alternative embodiment illustrated in FIG. 4, the driver-detection subsystem 175 includes a facial recognition module 185. Typically, the facial recognition module 185 is software code that, when executed by a computer processor, analyzes an image (e.g., an image computer file) to detect the presence of a human face (or other portion of a human body) in the image. The driver-detection subsystem 175 determines that a driver is present in the driver compartment if the facial recognition module 185 detects a human face in a driver compartment image 170.

Figure 5:
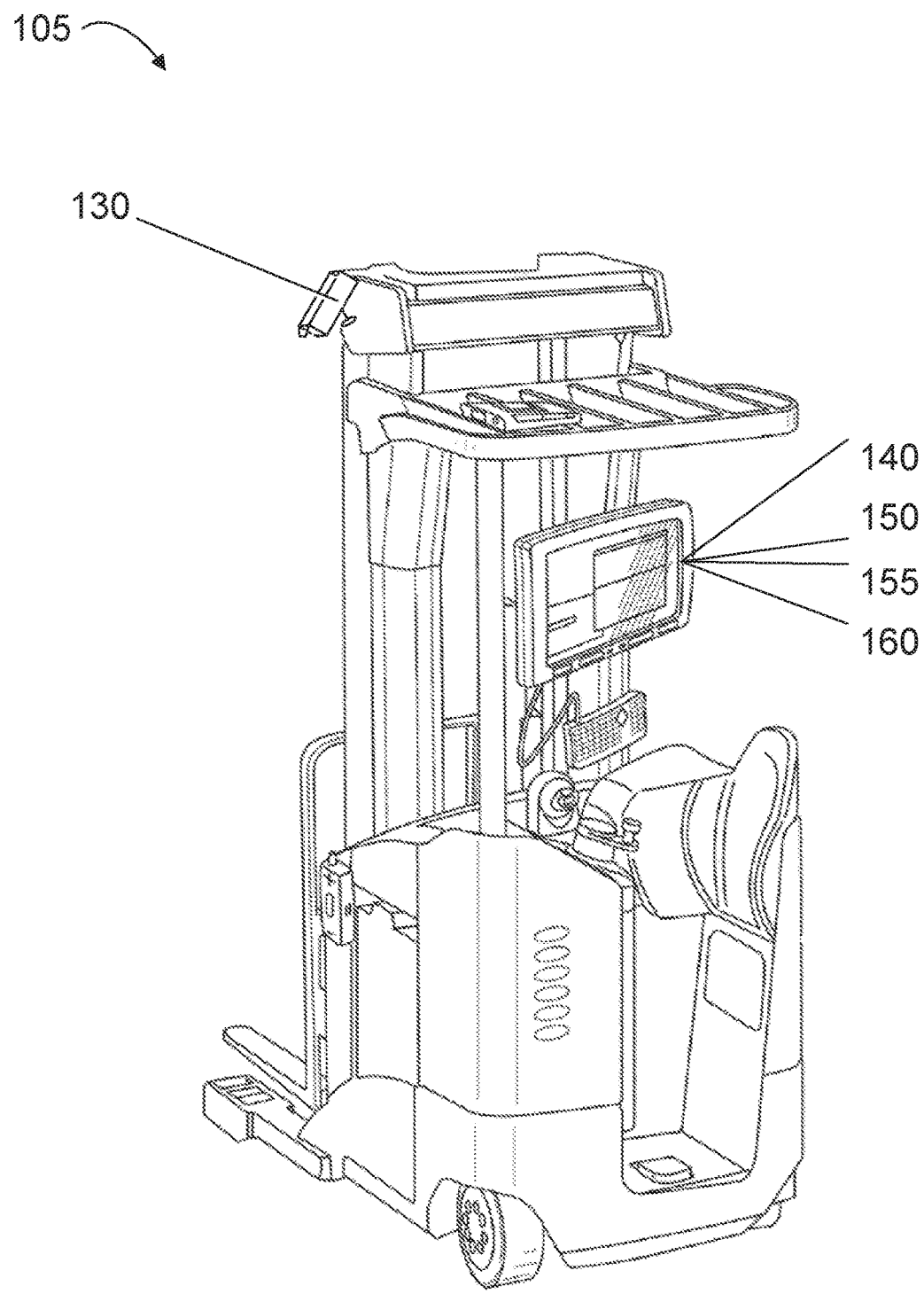
FIG. 5 is perspective view of a self-monitoring industrial vehicle according to the present disclosure.
Figure 6:
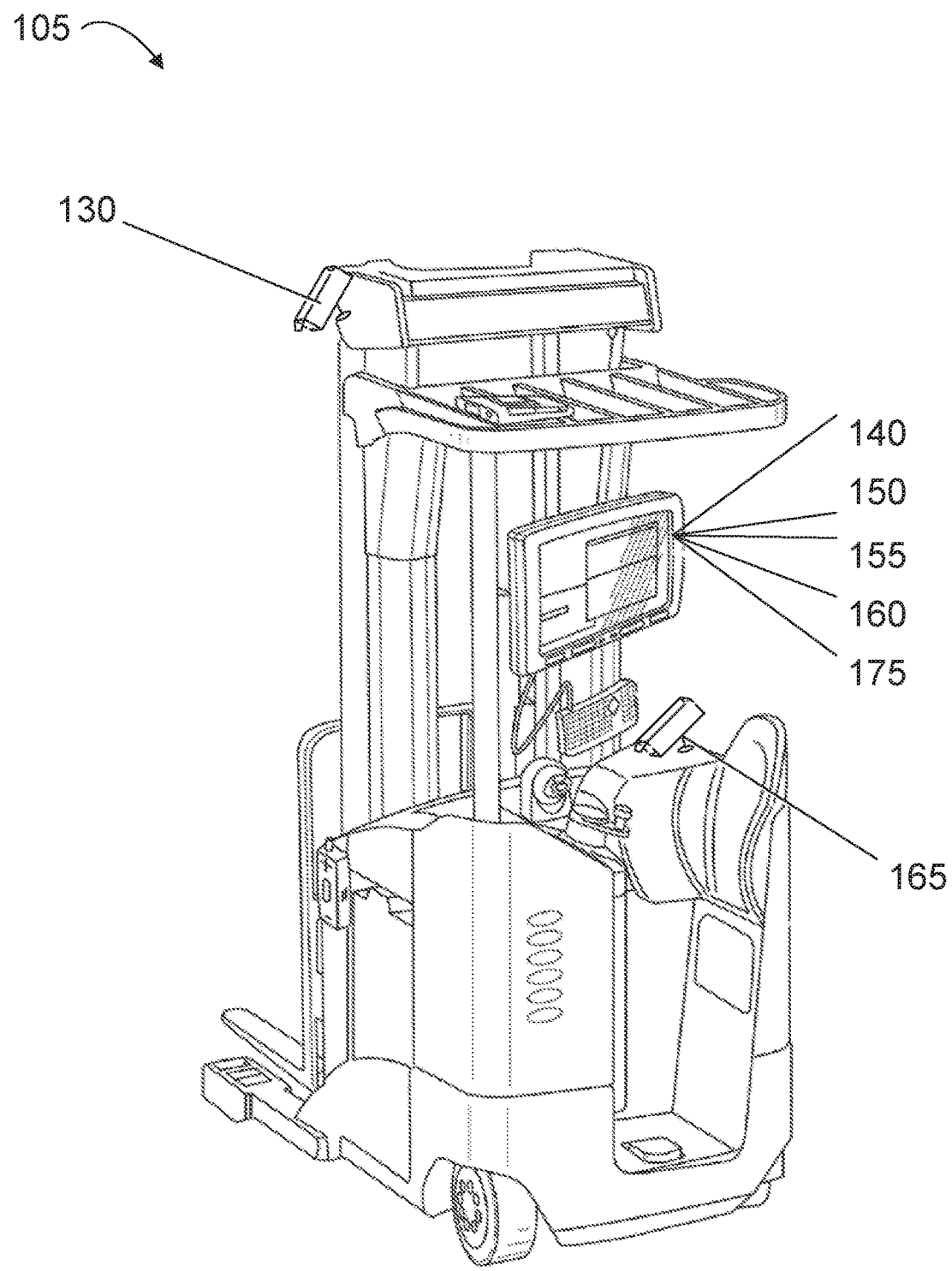
FIG. 6 is a perspective view of an alternative embodiment of a self-monitoring industrial vehicle according to the present disclosure.

As depicted in FIGS. 5 and 6, the present disclosure also embraces a self-monitoring industrial vehicle 105. The industrial vehicle 105 according to the present disclosure is outfitted with the components of embodiments of the system 100 described herein, including a first imaging subsystem 130, a cargo-detection subsystem 140, a power-detection subsystem 150, a motion-detection subsystem 155, and an analytics subsystem 160. In the embodiment of the industrial vehicle 105 illustrated in FIGS. 5 and 6, certain components (e.g., those that may be embodied as computer software/hardware) are embodied in a vehicle mount computer positioned on the industrial vehicle 105. FIG. 6 illustrates an alternative embodiment of an industrial vehicle 105 according to the present disclosure featuring a second imaging subsystem 165 and a driver-detection subsystem 175.

The present disclosure also embraces a computerized method of monitoring an industrial vehicle having a load-carrying portion and a driver compartment. Typically, the computerized method is carried out in accordance with the functionality of the embodiments of the system of the present disclosure.

To supplement the present disclosure, this application incorporates entirely by reference the following patents, patent application publications, and patent applications:

U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,818; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880;

U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. D702,237; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,525; U.S. Pat. No. 8,794,526; U.S. Pat. No. 8,798,367; U.S. Pat. No. 8,807,431; U.S. Pat. No. 8,807,432; U.S. Pat. No. 8,820,630; U.S. Pat. No. 8,822,848; U.S. Pat. No. 8,824,692; U.S. Pat. No. 8,824,696; U.S. Pat. No. 8,842,849; U.S. Pat. No. 8,844,822; U.S. Pat. No. 8,844,823; U.S. Pat. No. 8,849,019; U.S. Pat. No. 8,851,383; U.S. Pat. No. 8,854,633; U.S. Pat. No. 8,866,963; U.S. Pat. No. 8,868,421; U.S. Pat. No. 8,868,519; U.S. Pat. No. 8,868,802; U.S. Pat. No. 8,868,803; U.S. Pat. No. 8,870,074; U.S. Pat. No. 8,879,639; U.S. Pat. No. 8,880,426; U.S. Pat. No. 8,881,983; U.S. Pat. No. 8,881,987; U.S. Pat. No. 8,903,172; U.S. Pat. No. 8,908,995; U.S. Pat. No. 8,910,870; U.S. Pat. No. 8,910,875; U.S. Pat. No. 8,914,290; U.S. Pat. No. 8,914,788; U.S. Pat. No. 8,915,439; U.S. Pat. No. 8,915,444; U.S. Pat. No. 8,916,789; U.S. Pat. No. 8,918,250; U.S. Pat. No. 8,918,564; U.S. Pat. No. 8,925,818; U.S. Pat. No. 8,939,374; U.S. Pat. No. 8,942,480; U.S. Pat. No. 8,944,313; U.S. Pat. No. 8,944,327; U.S. Pat. No. 8,944,332; U.S. Pat. No. 8,950,678; U.S. Pat. No. 8,967,468; U.S. Pat. No. 8,971,346; U.S. Pat. No. 8,976,030; U.S. Pat. No. 8,976,368; U.S. Pat. No. 8,978,981; U.S. Pat. No. 8,978,983; U.S. Pat. No. 8,978,984; U.S. Pat. No. 8,985,456; U.S. Pat. No. 8,985,457; U.S. Pat. No. 8,985,459; U.S. Pat. No. 8,985,461; U.S. Pat. No. 8,988,578; U.S. Pat. No. 8,988,590; U.S. Pat. No. 8,991,704; U.S. Pat. No. 8,996,194; U.S. Pat. No. 8,996,384; U.S. Pat. No. 9,002,641; U.S. Pat. No. 9,007,368; U.S. Pat. No. 9,010,641; U.S. Pat. No. 9,015,513; U.S. Pat. No. 9,016,576; U.S. Pat. No. 9,022,288; U.S. Pat. No. 9,030,964; U.S. Pat. No. 9,033,240; U.S. Pat. No. 9,033,242; U.S. Pat. No. 9,036,054; U.S. Pat. No. 9,037,344; U.S. Pat. No. 9,038,911; U.S. Pat. No. 9,038,915; U.S. Pat. No. 9,047,098; U.S. Pat. No. 9,047,359; U.S. Pat. No. 9,047,420; U.S. Pat. No. 9,047,525; U.S. Pat. No. 9,047,531; U.S. Pat. No. 9,053,055; U.S. Pat. No. 9,053,378; U.S. Pat. No. 9,053,380; U.S. Pat. No. 9,058,526; U.S. Pat. No. 9,064,165; U.S. Pat. No. 9,064,167; U.S. Pat. No. 9,064,168; U.S. Pat. No. 9,064,254; U.S. Pat. No. 9,066,032; U.S. Pat. No. 9,070,032;

U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;

U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and figures, typical embodiments of the invention have been disclosed. The present invention is not limited to such exemplary embodiments. Unless otherwise noted, specific terms have been used in a generic and descriptive sense and not for purposes of limitation.

What is claimed is:

1. A system for monitoring an industrial vehicle having a load-carrying portion and a driver compartment, comprising:
   a first imaging subsystem for acquiring a plurality of load-carrying-portion images;
   a cargo-detection subsystem in communication with the first imaging subsystem, the cargo-detection subsystem configured for analyzing each of the plurality of load-carrying-portion images to determine whether cargo is positioned on the load-carrying portion;
   a power-detection subsystem for determining when the industrial vehicle is running;
   a motion-detection subsystem for determining when the industrial vehicle is in motion; and
   an analytics subsystem in communication with the cargo-detection subsystem, the power-detection subsystem, and the motion-detection subsystem, the analytics subsystem configured for calculating (i) the amount of time that the industrial vehicle is running; (ii) the amount of time that the industrial vehicle is running while cargo is positioned on the load-carrying portion; (iii) the amount of time the industrial vehicle is in motion; and (iv) the amount of time the industrial vehicle is in motion while cargo is positioned on the load-carrying portion.

2. The system of claim 1, wherein the cargo-detection subsystem determines whether cargo is positioned on the load-carrying portion by comparing each of the plurality of load-carrying-portion images to a configuration image of the load-carrying portion.

3. The system of claim 2, wherein the configuration image of the load-carrying portion is an image of the load-carrying portion with no cargo.

4. The system of claim 1, comprising:
   a second imaging subsystem for acquiring a plurality of driver compartment images;
   a driver-detection subsystem for analyzing the plurality of driver compartment images to determine whether a driver is present in the driver compartment;
   wherein the analytics subsystem is in communication with the driver-detection subsystem and is further configured for calculating the total time that the vehicle is running while a driver is present in the driver compartment.

5. The system of claim 4, wherein the driver-detection subsystem determines whether a driver is present in the driver compartment by comparing each of the plurality of driver compartment images to a configuration image of the driver compartment.

6. The system of claim 5, wherein the configuration image of the driver compartment is an image of the driver compartment with no driver present.

7. The system of claim 4, wherein:
   the driver-detection subsystem includes a facial recognition module; and
   the driver-detection subsystem determines that a driver is present in the driver compartment if the facial recognition module detects a human face in a driver compartment image.

8. An self-monitoring industrial vehicle having a load-carrying portion and a driver compartment, comprising:
   a first imaging subsystem for acquiring a plurality of load-carrying-portion images;
   a cargo-detection subsystem in communication with the first imaging subsystem, the cargo-detection subsystem configured for analyzing the plurality of load-carrying-portion images to determine whether cargo is positioned on the load-carrying portion;
   a power-detection subsystem for determining when the industrial vehicle is running;
   a motion-detection subsystem for determining when the industrial vehicle is in motion; and
   an analytics subsystem in communication with the cargo-detection subsystem, the power-detection subsystem, and the motion-detection subsystem, the analytics subsystem configured for calculating (i) the amount of time that the industrial vehicle is running; (ii) the amount of time that the industrial vehicle is running while cargo is positioned on the load-carrying portion; (iii) the amount of time the industrial vehicle is in motion; and (iv) the amount of time the industrial vehicle is in motion while cargo is positioned on the load-carrying portion.

9. The industrial vehicle of claim 8, wherein the cargo-detection subsystem determines whether cargo is positioned on the load-carrying portion by comparing each of the plurality of load-carrying-portion images to a configuration image of the load-carrying portion.

10. The industrial vehicle of claim 9, wherein the configuration image of the load-carrying portion is an image of the load-carrying portion with no cargo.

11. The industrial vehicle of claim 8, comprising:
a second imaging subsystem for acquiring a plurality of driver compartment images;
a driver-detection subsystem in communication with the second imaging subsystem, the driver-detection subsystem configured for analyzing the plurality of driver compartment images to determine whether a driver is present in the driver compartment;
wherein the analytics subsystem is in communication with the driver-detection subsystem and is further configured for calculating the total time that the vehicle is running while a driver is present in the driver compartment.

12. The industrial vehicle of claim 11, wherein the driver-detection subsystem determines whether a driver is present in the driver compartment by comparing each of the plurality of driver compartment images to a configuration image of the driver compartment.

13. The industrial vehicle of claim 12, wherein the configuration image of the driver compartment is an image of the driver compartment with no driver present.

14. The industrial vehicle of claim 11, wherein:
the driver-detection subsystem includes a facial recognition module; and
the driver-detection subsystem determines that a driver is present in the driver compartment if the facial recognition module detects a human face in a driver compartment image.

15. A computerized method of monitoring an industrial vehicle having a load-carrying portion and a driver compartment, comprising:
acquiring a plurality of load-carrying-portion images of the industrial vehicle;
analyzing using a computer the plurality of load-carrying-portion images of the industrial vehicle to determine whether cargo is positioned on the load-carrying portion;
determining when the industrial vehicle is running;
determining when the industrial vehicle is in motion;
calculating using the computer (i) the amount of time that the industrial vehicle is running; (ii) the amount of time that the industrial vehicle is running while cargo is positioned on the load-carrying portion; (iii) the amount of time the industrial vehicle is in motion; and (iv) the amount of time the industrial vehicle is in motion while cargo is positioned on the load-carrying portion.

16. The computerized method of claim 15, wherein determining whether cargo is positioning in the load-carrying portion includes comparing each of the plurality of load-carrying-portion images to a configuration image of the load-carrying portion.

17. The computerized method of claim 16, wherein the configuration image of the load-carrying portion is an image of the load-carrying portion with no cargo.

18. The computerized method of claim 15, comprising:
acquiring a plurality of driver compartment images;
analyzing using the computer the plurality of driver compartment images to determine whether a driver is present in the driver compartment; and
calculating using the computer the total time that the vehicle is running while a driver is present in the driver compartment.

19. The computerized method of claim 18, wherein determining of whether a driver is present in the driver compartment includes comparing each of the plurality of driver compartment images to a configuration image of the driver compartment.

20. The computerized method of claim 18, wherein determining whether a driver is present in the driver compartment includes analyzing each of the plurality of driver compartment images to determine whether a human face is present.

* * * * *